United States Patent
Shrivastava

(10) Patent No.: US 10,742,491 B2
(45) Date of Patent: Aug. 11, 2020

(54) REDUCING INITIAL NETWORK LAUNCH TIME OF CONTAINER APPLICATIONS

(71) Applicant: VMware, Inc., Palo Alto, CA (US)

(72) Inventor: Aditya Shrivastava, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 77 days.

(21) Appl. No.: 15/655,305

(22) Filed: Jul. 20, 2017

(65) Prior Publication Data

US 2019/0028335 A1 Jan. 24, 2019

(51) Int. Cl.
| | |
|---|---|
| *H04L 12/24* | (2006.01) |
| *G06F 9/50* | (2006.01) |
| *G06F 9/445* | (2018.01) |
| *G06F 9/4401* | (2018.01) |
| *G06F 9/455* | (2018.01) |

(52) U.S. Cl.
CPC ........ *H04L 41/0806* (2013.01); *G06F 9/4406* (2013.01); *G06F 9/4416* (2013.01); *G06F 9/44521* (2013.01); *G06F 9/44557* (2013.01); *G06F 9/5005* (2013.01); *G06F 9/45558* (2013.01); *G06F 2009/45562* (2013.01); *H04L 41/12* (2013.01)

(58) Field of Classification Search
CPC .................................................. H04L 41/0806
See application file for complete search history.

(56) References Cited

U.S. PATENT DOCUMENTS

| | | | | |
|---|---|---|---|---|
| 6,032,240 | A | * | 2/2000 | Brown ................... G06F 9/5016 711/103 |
| 9,069,607 | B1 | | 6/2015 | Gopalakrishna Alevoor et al. |
| 9,575,774 | B2 | | 2/2017 | Clark |
| 2002/0112150 | A1 | * | 8/2002 | Lawing ................. H04L 41/044 713/1 |
| 2003/0192033 | A1 | * | 10/2003 | Gartside ................... G06F 8/61 717/126 |
| 2004/0177319 | A1 | | 9/2004 | Horn |
| 2009/0210441 | A1 | | 8/2009 | Mercer et al. |
| 2010/0037235 | A1 | | 2/2010 | Larimore et al. |
| 2011/0282868 | A1 | | 11/2011 | Ishii |
| 2012/0005237 | A1 | | 1/2012 | Obata |
| 2012/0089666 | A1 | * | 4/2012 | Goswami ............. G06Q 10/103 709/203 |
| 2014/0059525 | A1 | | 2/2014 | Jawa et al. |
| 2014/0245444 | A1 | | 8/2014 | Lutas et al. |
| 2015/0227567 | A1 | | 8/2015 | Zamir et al. |
| 2016/0012075 | A1 | | 1/2016 | Ukai |

(Continued)

*Primary Examiner* — Nasser M Goodarzi
*Assistant Examiner* — Adil Ocak
(74) *Attorney, Agent, or Firm* — Patterson + Sheridan, LLP

(57) ABSTRACT

A computer system is configured to support execution of a virtualized application, the files of which are stored in and retrieved from network storage. The method of launching the virtualized application includes (i) responsive to a first user event occurring prior to any user event for launching the virtualized application after user logon, executing a driver to fetch a subset of the files of the virtualized application from the network storage into system memory of the computer system, and (ii) responsive to a second user event corresponding to a launch of the virtualized application, instantiating an execution space for the virtualized application and loading the fetched files into the system memory for execution.

22 Claims, 3 Drawing Sheets

(56) References Cited

U.S. PATENT DOCUMENTS

2017/0243001 A1    8/2017  Jawa et al.
2017/0244749 A1*   8/2017  Shulman ............. H04L 63/1441
2017/0249252 A1    8/2017  Elias et al.
2017/0308367 A1*  10/2017  Clothier .................. G06F 9/445

* cited by examiner

REDUCING INITIAL NETWORK LAUNCH TIME OF CONTAINER APPLICATIONS

BACKGROUND

Application virtualization is a generally known technique for decoupling an application from its underlying operating system to eliminate application conflicts and streamline application delivery and management. One example of a solution that provides application virtualization is ThinApp®, made available by VMware, Inc. of Palo Alto, Calif. A virtual application is generated by encapsulating application resources into a virtual application package that can be deployed, managed, and updated independently from the underlying operating system (OS). The package itself is enclosed within a virtualized container file. The application package includes an executable virtualization layer logically interposed between the OS and the application, providing a sandbox-type of environment (sometimes referred to as a "virtualized environment") isolated, or partially isolated, from the underlying OS or other applications. As such, the virtual applications do not make any changes to the underlying OS and continue to behave the same across different configurations for compatibility, consistent end-user experiences, and ease of management.

As stated, virtualized application packages that encapsulate applications are able to isolate applications from underlying operating systems. Benefits of virtualizing within virtualized application packages files include the ability to run the applications on various versions of operating systems, whether the application would be installable on that version of the operating system otherwise. For example, if an application is compatible with Microsoft Windows® version 7 but not with Microsoft Windows® version 10, the application can be packaged into a virtualized application package that that runs on version 10, but where the files within the package create a version 7 runtime environment for the application. The virtualization layer merges the underlying physical and virtual resources to fool an application into thinking that it is running as if it were fully installed.

Virtualized application software ideally does not have any pre-installed components and does not require the installation of device drivers, thus allowing applications to run from USB flash drives or network shares without requiring administrator rights. Virtualized application software, such as ThinApp®, is also able to scan a system before and after an application's installation and create a portable virtualized container, containing a virtualized application package, based upon changes made to the system files and registry.

A virtualized application package on remote network storage provides storage savings. However, the use of a virtualized container stored in network storage can result in delays caused by network congestion.

SUMMARY

Embodiments provide a computer system configured to support execution of a virtualized application, the files of which are stored in and retrieved from network storage. A method of launching the virtualized application, according to an embodiment, includes (i) responsive to a first user event occurring prior to any user event for launching the virtualized application after user logon, executing a driver to fetch a subset of the files of the virtualized application from the network storage into system memory of the computer system, and (ii) responsive to a second user event corresponding to a launch of the virtualized application, instantiating an execution space for the virtualized application and loading the fetched files into the system memory for execution.

Further embodiments include a non-transitory computer-readable storage medium storing instructions that, when executed by a computing device, cause the computing device to perform the method set forth above, and a computing device programmed to carry out the method set forth above.

DETAILED DESCRIPTION

Figure 1:
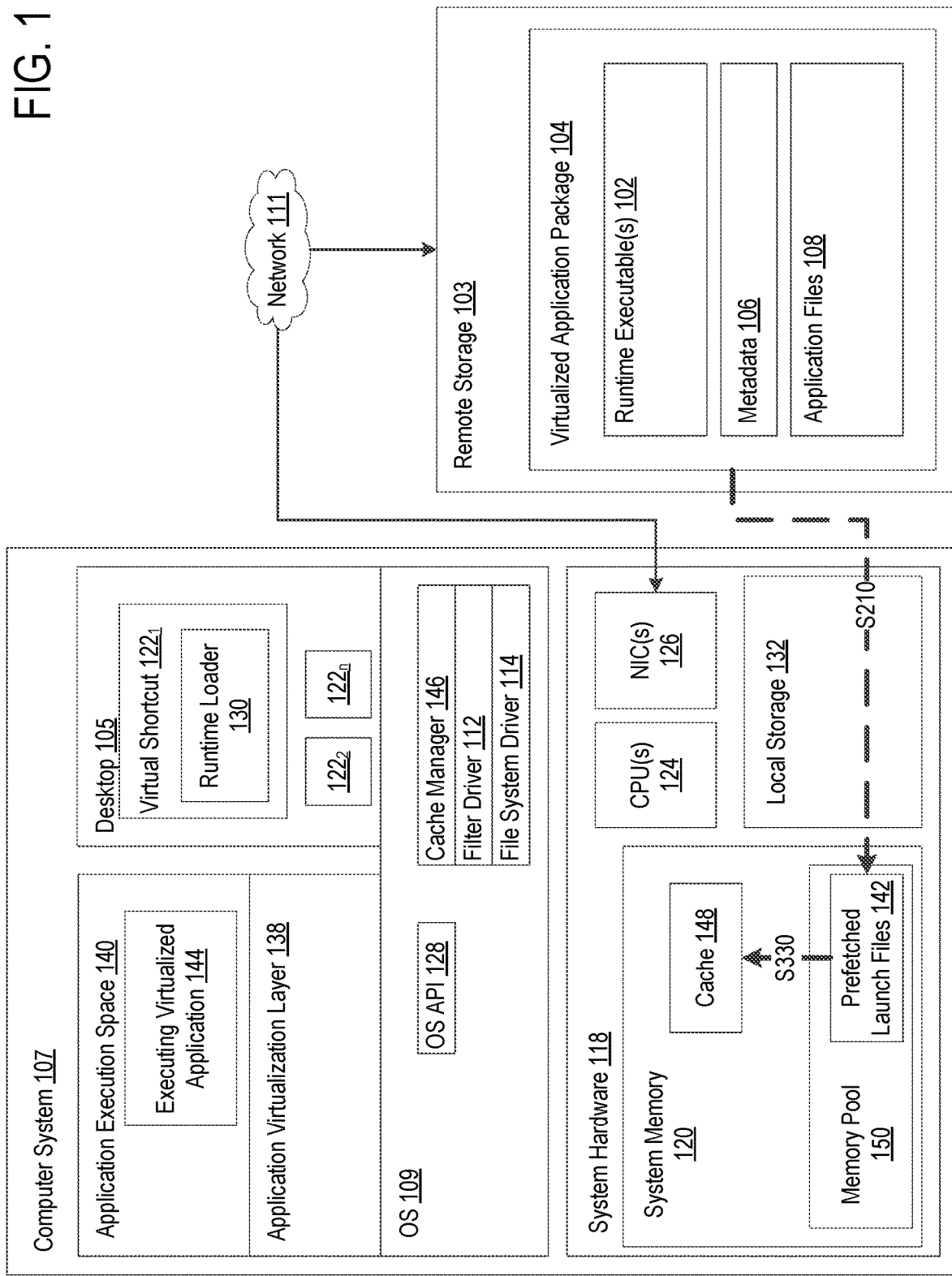
FIG. 1 is a block diagram of a computer system in which embodiments may be carried out.

FIG. 1 is a block diagram of a computer system 107 in which embodiments may be carried out. Computer system 107 communicates with remote storage 103 via network 111, which is, for example, a wide area network (WAN) or a public network such as the Internet. Computer system 107 includes system hardware 118 and operating system (OS) 109. System hardware 118 includes system memory 120, non-volatile local storage 132, one or more central processing units (CPUs) 124, and one or more network interface controllers (NICs) 126 by which computer system 107 is connected to network 111. Operating system 109 includes a software stack through which input/output operations (IOs) are carried out. This software stack includes a cache manager 146 at the top, a filter driver 112, and then a file system driver 114, which is at the bottom. Read and write calls made to OS APIs 128 are processed through this software stack.

Remote storage 103 includes persistent storage in which one or more virtualized application packages are stored. In the embodiment illustrated herein, virtualized application package 104 is illustrated as stored in remote storage 103. In one embodiment, remote storage 103 is network-attached storage (NAS). Virtualized application package 104 includes a number of files including runtime executable 102, metadata 106, and application files 108.

Virtualized application package 104 is typically read-only and cannot be modified. User-specific changes are stored into a separate file (not shown). Runtime executable 102 represents executable code that implements an application virtualization layer 138 between an executing virtualized application 144 and operating system 109. That is, application virtualization layer 138 provides the sandbox-type of environment (virtualized environment) that is isolated from the underlying OS or other applications.

Metadata 106 contains file names, an offset value (e.g., in bytes) identifying a start location of a corresponding file within virtualized application package 104, as well as the length of the corresponding file, also in bytes. Each file packaged in virtualized application package 104 can be located by traversing a file directory within the metadata 106 to identify an offset and length, and therefore the location, of the corresponding file.

The virtualized application package 104 may also contain configuration settings (not shown). Configuration settings is a feature of the virtualized application package 104 that allows an administrator, i.e., a person creating or deploying virtualized application package 104, to alter the behavior and/or impose restrictions on the use of virtualized application package 104. These restrictions are used to enforce security policies, access restrictions, or licensing limitations.

Application files 108 are files of the virtualized application, e.g., executable code of the virtualized application and other files required by the executable code. For example, in order to execute the application, Microsoft Word®, on Microsoft Windows®, the files that would be required include an executable code "winword.exe," DLL files such as NTDLL.dll and shell.dll, and various registry files.

In one embodiment, the virtualized application is launched by double-clicking on a shortcut 122 corresponding to the virtualized application. The shortcut is created when the virtualized application is deployed on a desktop 105. When the shortcut is accessed (e.g., user double clicks on the shortcut), runtime loader 130 loads and executes runtime executable 102, which instantiates virtualized application execution space 140 for the virtualized application. The details of launching the virtualized application in response to user access of the shortcut are described below in conjunction with FIG. 3.

In addition to creating virtualized application execution space 140, runtime executable 102 also loads application files 108 into system memory 120 and maps the loaded application files in virtualized application execution space 140. However, for the initial launch of the virtualized application, not all files of the virtualized application need to be loaded into system memory. The files that are needed for the initial launch are launch files. Launch files represent a subset of files needed to execute the virtualized application. A list of launch files for a particular virtualized application is created by one of several methods which are described below.

System memory 120 includes an area reserved for cache 148. Cache 148 is reserved by operating system 109, in particular, cache manager 146. Cache manager 146 stores data that are read or written pursuant to IOs in cache 148 for access without issuing the IOs to storage.

Operating system 109 manages system hardware 118 and provides services for computer applications executing on computer system 107. According to embodiments, operating system 109 may be any of a number of commercially available operating systems, such as Microsoft Windows®, Linux®, or the OS X operating system from Apple, Inc. In embodiments where computer system 107 is a computer that provides a virtualized computing platform, OS 109 may be a hypervisor that supports the execution of virtual machines (VMs) on computer system 107. One example of such a hypervisor is VMware's ESX®.

Filter driver 112 is a driver customized according to embodiments. Filter driver 112 intercepts all calls to file system driver 114 and either forwards the calls unmodified, forwards the calls modified, or answers the calls, as further described below. Filter driver 112 is loaded upon user login to computer system 107. In one embodiment, when filter driver 112 is loaded, it performs a pre-fetching process 200 of launch files as further described below in conjunction with FIG. 2.

Operating system 109 also includes various operating system application programming interfaces (OS APIs) 128, which contain functionality allowing operating system 109 to load files for execution. One such OS API 128 of the Microsoft Windows® operating system is NTDLL, which is an API for launch files for execution.

Desktop 105 contains a plurality of virtual shortcuts $122_1$-$122_n$. Virtual shortcuts $122_1$-$122_n$ link to a particular virtualized application within virtualized application package 104. Virtual shortcuts $122_1$-$122_n$ are created by an administrator and may be deployed to computer system 107 at the time of creation of a virtualized application package 104. Each virtual shortcut 122 loads and executes runtime loader 130, which is employed to load the virtualized applications according to embodiments.

As described in background, one issue with launching a virtualized application from remote storage 103 is the length of time to transfer launch files across network 111. Embodiments address this issue by pre-fetching launch files into system memory 120 prior to launching the virtualized application. In one embodiment, this pre-fetching is triggered by upon user logon. In other embodiments, this pre-fetching may be triggered by any user access that results in an IO to file system driver 114, which is intercepted by filter driver 112.

Figure 2:
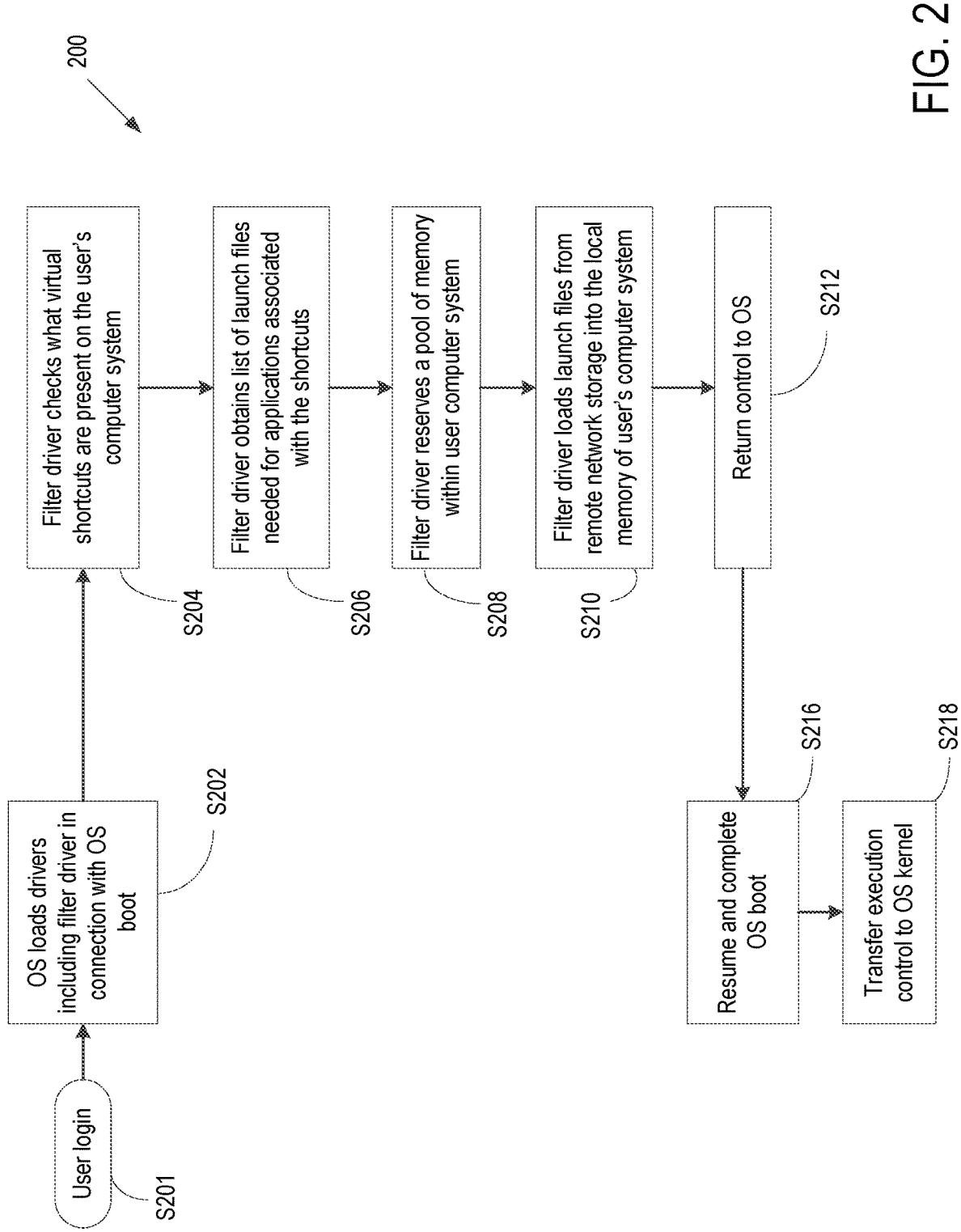
FIG. 2 depicts a process of pre-fetching launch files stored in remote storage, according to an embodiment.

FIG. 2 depicts a pre-fetching process 200 of launch files stored in remote storage 103. Filter driver 112 performs pre-fetching process 200. During pre-fetching process 200, filter driver 112 transfers launch files to computer system 107 prior to a user launching an application associated with launch files. If launch files are located on computer system 107 when user launches the associated virtualized application, then the launch will be relatively fast compared to if launch files were located on remote storage 103 at time of launch.

Pre-fetching process 200 begins at step S201 when user logs in to computer system 107. Although pre-fetching process 200 is depicted in FIG. 2 as triggered by user login, pre-fetch process 200 may be triggered by other events. For example, the pre-fetching process may be triggered by low demand on CPU 124, network 111, or by other events when pre-fetching launch files might be advantageous.

At step S202, operating system 109 loads filter driver 112 as part of the loading of operating system 109 onto computer system 107. Operating system 109 may load filter driver 112 before its own loading is fully completed, or operating system 109 may load filter driver 112 after its own loading is fully completed.

At step S204, filter driver 112 scans desktop 105 for virtual shortcuts 122. Presence of virtual shortcuts 122 on computer system 107 indicates what virtual applications that user uses.

Filter driver 112 may also scan other components of computer system 107 besides desktop 105 prior to pre-fetching launch files, in order to gain additional information. For example, a computer system 107 may have links to virtual applications in components other than desktop 105. Filter driver 112 may scan these components and add applications associated with located virtual shortcuts to the list of virtual applications for which to perform pre-fetch process 200. Filter driver 112 may also gather information on what virtual applications the user uses at a high frequency as opposed to what virtual applications the user uses at a low frequency. Optionally, filter driver 112 may then only perform pre-fetch process 200 for the frequently used virtual applications and not for the infrequently used virtual applications.

At step S206, filter driver 112 obtains a list of launch files needed for initial launch of application associated with virtual shortcut 222. Before filter driver 112 can retrieve launch files from remote storage 103 and place them onto computer system 107, filter driver 112 must know what files are needed for the initial launch of the virtualized application. Such a list may be obtained by accessing a database, for example.

A list of launch files for a given virtualized application may be created by either of the following two methods. One method is for an administrator to manually create the list and place it in a database accessible by filter driver 112. An administrator can create such a list by taking a pre-launch snapshot of computer system 107. Then, the administrator launches a given application by double-clicking on shortcut 122 and waits until files needed for launch transfer across network 103. The administrator may also wait until an executing virtualized application 144 executes within virtualized application execution space 140 on computer system 107. Administrator compares the pre-launch snapshot to the post-launch computer system 107. Files that are on post-launch computer system 107 but not on the pre-launch snapshot are launch files needed for launch of application associated with shortcut 122. Details of launch files, such as name, size, and location within virtualized application package 104, are identified and placed into a database accessible by filter driver 112. Various software known in the art is available for comparing pre-launch and post-launch state of computer system 107, for the purpose of identifying launch files associated with a particular virtualized application.

Another method for creating a list of launch files is to dynamically create the list upon first launch of a given application contained in virtual package 104 by any user connected by network 111. If filter driver 112 attempts to access a list of launch files for a virtualized application but that list is unavailable, filter driver 112 may wait until this virtualized application is launched by double-clicking on an associated virtual shortcut 122. Upon launch of virtualized application, filter driver 112 tracks what files are transferred over network 206 and used to launch the virtualized application associated with shortcut 122. The list of files identified by filter driver 112 as launch files for a given virtualized application, along with details such as name, size, and offset within virtualized application package file 104, are then added to a database accessible by filter driver 112.

The list of files identified by filter driver 112 as launch files for a given virtualized application can automatically be shared through network 111 to all users connected by network 111. Thus, filter driver 112 in all computer systems 107 connected by network 111 are able to retrieve a list of launch files for a given virtualized application within a virtualized application package 104 upon initial launch of the virtualized application by any user.

At step S208, filter driver 112 reserves memory pool 150 in anticipation of arrival of launch files across network 111. Filter driver 112 determines the size of memory pool 150 by analyzing the list of launch files obtained in step S206. Optionally, step S208 may be performed concurrently with step S210, such that the size of memory pool 150 is adjusted dynamically as launch files arrive from across network 111.

In one embodiment, memory pool 150 includes paged memory and non-paged memory. In other embodiments, memory pool 150 consists only of paged memory or only of non-paged memory. Paged memory is memory whose data that can be swapped between local storage 132 and system memory 120. When paged memory in system memory 120 becomes full or experiences memory stress, operating system 109 moves or "swaps" some of the data in paged memory to local storage 132. When the data moved from paged memory into local storage 132 is needed by computer system 107, operating system 109 swaps that data back into paged memory within system memory 120. Local storage 132 thus acts as a backup to paged memory.

System memory 120 also includes non-paged memory. Non-paged memory is memory whose data cannot be swapped to local storage 132 and thus remains in system memory 120 until no longer needed by operating system 109. Non-paged memory is a limited resource during a session of the operating system 109. Therefore, there is a configurable limit as to how much of memory pool 150 is configured as non-paged memory. Typically, cache 148 is configured in non-paged memory so that data of cache 148 is prevented from swapping out to local storage 132 and offsetting the performance benefits of cache 148.

At step S210, filter driver 112 retrieves launch files from remote storage 103. Filter driver 112 places launch files into memory pool 250 as launch files arrive at computer system 107. Launch files become pre-fetched launch files 142 within system memory 120, as denoted in FIG. 1. Pre-fetched launch files 142 are ready to be loaded into virtualized application execution space 140 when user double-clicks on shortcut 122.

In one embodiment, filter driver 112 places launch files in non-paged memory of memory pool 150 until the user configurable limit is reached, and places the rest of launch files in paged memory of memory pool 150. In another embodiment, filter driver 112 places launch files identified as frequently launched by computer system 107, in non-paged memory of memory pool 150, and places the rest of launch files within paged memory of memory pool 150.

At step S212, filter driver 112 returns control to operating system 109, which completes its loading onto computer system 107 at step S216, if loading of operating system 109 had not completed by that time. At step S218, when operating system 109 fully loads onto computer system 107, kernel (not shown) of operating system 109 gains control of computer system 107 for normal operation of computer system 107.

Figure 3:
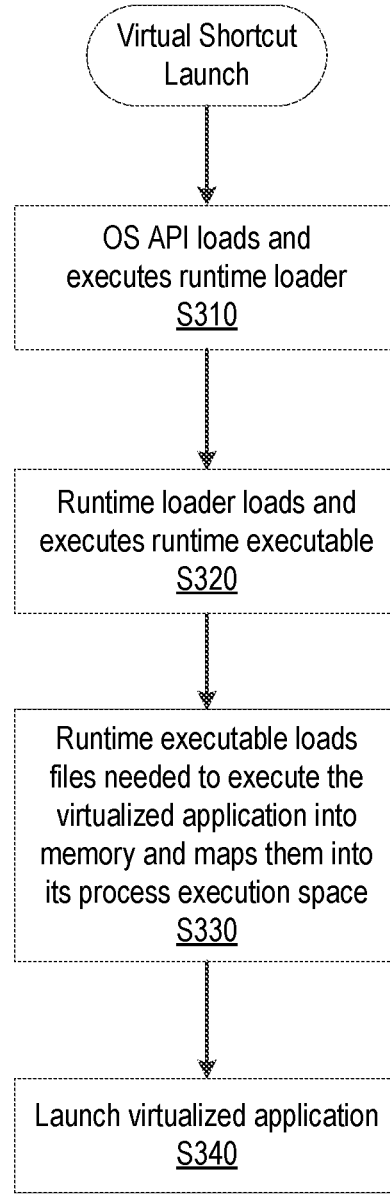
FIG. 3 depicts a process of launching a virtualized application, according to an embodiment.

FIG. 3 depicts a process of launching a virtualized application, according to an embodiment. The process begins at virtual shortcut launch, which occurs when a user double-clicks virtual shortcut 122, and operating system 109 sends a call that creates an address space for a new process within virtualized application execution space 140. Such a call could be, for example, a CreateProcess call in a Microsoft Windows® operating system. The call to create a new process loads OS API 128 (e.g., NTDLL in Microsoft Windows®) into address space of the newly created process.

In step S310, OS API 128 loads and executes runtime loader 130. In step S320, runtime loader 130 makes a call to OS API 128 (e.g., a CreateFile or OpenFile call in Microsoft Windows®) so as to load runtime executable 102, which is among launch files needed for the launching of the virtualized application that is associated with the double-clicked virtual shortcut 122. Responsive to this call, OS API 128 first locates runtime executable 102 and then returns a handle for runtime executable 102.

OS API 128 first checks cache 148 for the presence of runtime executable 102 by making a call to cache manager 146. Because this is an initial launch, OS API 128 will not locate runtime executable 102 in cache 148.

OS API 128 then makes a call to file system driver 114 (e.g., a ReadFile call in Microsoft Windows®), which is intercepted by filter driver 112. If filter driver 112 were not present in computer system 107, then the call would go to the file system driver 114, which would notice that files attempted to be read are network files located on remote storage 103, and file system driver 114 would retrieve runtime executable 102 from launch files located on remote storage 103. However, all calls to file system driver 114 are intercepted by filter driver 112. Thus, the read call to file system driver 114 is intercepted by filter driver 112. Filter driver 112 analyzes the call from OS API 128 and notices that the call is for runtime executable 102, which is present within pre-fetched launch files 142.

Filter driver 112 answers the call from OS API 128 by supplying runtime executable 102 from within pre-fetched launch files 142 and notifying OS API 128, which in turn notifies runtime loader 130 of this action. Filter driver 112 supplies the requested portion of pre-fetched launch files 142 to runtime loader 130 by copying runtime executable 102 of pre-fetched launch files 142 into cache 148. Filter driver 112 then returns a handle for runtime executable 102 to runtime loader 130 via OS API 128.

After filter driver 112 notifies runtime loader 130 that runtime executable is available within cache 148, runtime loader 130 loads and executes runtime executable 102 to create virtualized application execution space 140. Once runtime executable 102 is loaded, runtime executable 102 in step S330 proceeds to load the rest of pre-fetched launch files 142 following a similar process for loading of runtime executable 102 by runtime loader 130, as described above. As a result, each of launch files 142 is mapped in virtualized application execution space 140.

At step S340, runtime executable 102 launches the virtualized application associated with virtual shortcut 122, resulting in an executing virtualized application 144.

After pre-fetched launch files 142 are loaded into application execution space 140, the rest of the files of the virtualized application begins to transfer from remote storage 103 to computer system 107 to give the user full functionality of the virtualized application associated with virtual shortcut 122.

Subsequently, filter driver 112 optionally unreserves memory pool 150 that had been reserved for pre-fetched launch files 142 within system memory 120. Unreserving memory pool 150 causes pre-fetched launch files 142 to be cleared from memory pool 150 but to remain within cache 148.

Alternatively, to retain launch files for subsequent launches, filter driver 112 does not unreserve memory pool 150. Not unreserving memory pool 150 causes pre-fetched launch files 142 to remain in memory pool 150. Retaining pre-fetched launch files 142 in memory pool 150 is potentially advantageous because, otherwise, the copy of pre-fetched launch files 142 in cache 148 is cleared from cache 148 by cache manager 146 shortly after the virtual application associated with pre-fetched launch files 142 is closed by the user. Cache manager 146 clears pre-fetched launch files 142 from cache 148 because files fetched from network 111 do not remain in cache 148 after their handles are closed. Thus, retaining pre-fetched launch files 142 in memory pool 150 is potentially advantageous because pre-fetched launch files 142 remain available for subsequent launches of the same virtualized application, rather than for only the initial launch.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. In a computer system configured to support execution of a virtualized application, wherein files of the virtualized application are stored in and retrieved from network storage, a method of launching the virtualized application, said method comprising:
   triggered by a user logon, and prior to any user event for a launching of a shortcut of the virtualized application:
      determining, by a driver, existence of the shortcut of the virtualized application on the computer system;
      identifying, by the driver, a subset of files of the virtualized application that are required for the launch of the virtualized application; and
      fetching, by the driver, the subset of the files of the virtualized application from the network storage into system memory of the computer system; and
   responsive to a user event corresponding to the launching of the shortcut of the virtualized application, instantiating, by a runtime loader, an execution space for the virtualized application and loading the fetched files into the system memory for execution.

2. The method of claim 1, wherein the subset of the files is fetched into a first location in the system memory and loaded into a second location in the system memory for execution.

3. The method of claim 2, wherein the computer system includes a cache configured in the system memory for input/output operations, and the cache includes the second location.

4. The method of claim 3, wherein the subset of the files is moved from the first location to the second location, such that at a time of the launch, no more than one copy of the fetched files is in the system memory.

5. The method of claim 1, wherein
   prior to fetching the subset of the files of the virtualized application, the driver determines that the virtualized application is an installed virtualized application of the computer system.

6. The method of claim 5, wherein a virtualized application package is created for the virtualized application and stored in the network storage, and the virtualized application package includes the fetched files of the virtualized application and other files of the virtualized application.

7. The method of claim 1, wherein the driver is configured as a filter driver that intercepts and processes input/output operations prior to the input/output operations being processed by a file system driver.

8. The method of claim 1, wherein the subset of the files is fetched into non-paged memory until a configurable limit is reached, and then into paged memory after the limit is reached.

9. The method of claim 1, the method further comprising, prior to the executing the driver to fetch the subset of the files:
   determining that the executing the driver to fetch the subset of files is to be performed for the virtualized application, but not for a second virtualized application.

10. The method of claim 1, wherein the driver is a component of an operating system of the computer system.

11. A non-transitory computer readable medium comprising instructions to be executed in a processor of a computer system configured to support execution of a virtualized application, wherein files of the virtualized application are stored in and retrieved from network storage and the instructions when executed in the processor cause the computer system to carry out a method of launching the virtualized application, said method comprising:
   triggered by a user logon, and prior to any user event for a launching of a shortcut of the virtualized application:
      determining, by a driver, existence of the shortcut of the virtualized application on the computer system;
      identifying, by the driver, a subset of files of the virtualized application that are required for the launch of the virtualized application; and
      fetching, by the driver, the subset of the files of the virtualized application from the network storage into system memory of the computer system; and
   responsive to a user event corresponding to the launching the shortcut of the virtualized application, instantiating, by a runtime loader, an execution space for the virtualized application and loading the fetched files into the system memory for execution.

12. The non-transitory computer readable medium of claim 11, wherein the subset of the files is fetched into a first location in the system memory and loaded into a second location in the system memory for execution.

13. The non-transitory computer readable medium of claim 12, wherein the computer system includes a cache configured in the system memory for input/output operations, and the cache includes the second location.

14. The non-transitory computer readable medium of claim 13, wherein the subset of the files is moved from the first location to the second location, such that at a time of the launch, no more than one copy of the fetched files is in the system memory.

15. The non-transitory computer readable medium of claim 14, wherein
prior to fetching the subset of the files of the virtualized application, the driver determines that the virtualized application is an installed virtualized application of the computer system.

16. The non-transitory computer readable medium of claim 15, wherein a virtualized application package is created for the virtualized application and stored in the network storage, and the virtualized application package includes the fetched files of the virtualized application and other files of the virtualized application.

17. The non-transitory computer readable medium of claim 11, wherein the driver is configured as a filter driver that intercepts and processes input/output operations prior to the input/output operations being processed by a file system driver.

18. The non-transitory computer readable medium of claim 11, wherein the subset of the files is fetched into non-paged memory until a configurable limit is reached, and then into paged memory after the limit is reached.

19. A computer system connected to network storage in which a virtualized application package that has been created for a virtualized application is stored, said computer system comprising:
a network interface controller connected to the network storage; and
a processor and system memory, wherein the processor is programmed to carry out a method of launching the virtualized application, said method including:
triggered by a user logon, and prior to any user event for a launching of a shortcut of the virtualized application:
determining, by a driver, existence of the shortcut of the virtualized application on the computer system;
identifying, by the driver, a subset of files of the virtualized application that are required for the launch of the virtualized application; and
fetching, by the driver, the subset of the files of the virtualized application from the network storage into system memory of the computer system; and
responsive to a user event corresponding to the launching the shortcut of the virtualized application, instantiating, by a runtime loader, an execution space for the virtualized application and loading the fetched files into the system memory for execution.

20. The computer system of claim 19, wherein the subset of the files is fetched into a first location in the system memory and loaded into a second location in the system memory for execution.

21. The computers system of claim 20, wherein the computer system includes a cache configured in the system memory for input/output operations, and the cache includes the second location.

22. The computer system of claim 21, wherein the subset of the files is moved from the first location to the second location, such that at a time of the launch, no more than one copy of the fetched files is in the system memory.

* * * * *